United States Patent
Bunch et al.

(10) Patent No.: US 8,223,062 B2
(45) Date of Patent: Jul. 17, 2012

(54) SYSTEMS AND METHODS FOR AIRCRAFT TO AIRCRAFT EXCHANGE OF RADAR INFORMATION OVER LOW BANDWIDTH COMMUNICATION CHANNELS

(75) Inventors: Brian Paul Bunch, Snohomish, WA (US); Michael M. Grove, Snohomish, WA (US); Willard R. True, Kirkland, WA (US); Ken Kuttler, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 334 days.

(21) Appl. No.: 12/472,644

(22) Filed: May 27, 2009

(65) Prior Publication Data

US 2010/0302093 A1 Dec. 2, 2010

(51) Int. Cl.
*G01S 13/00* (2006.01)
(52) U.S. Cl. ...................................... 342/26 B; 342/190
(58) Field of Classification Search .............. 342/26 B, 342/176
See application file for complete search history.

(56) References Cited

U.S. PATENT DOCUMENTS

| | | |
|---|---|---|
| 4,050,067 A | 9/1977 | Elmore, Jr. |
| 4,170,006 A | 10/1979 | Falk |
| 4,660,044 A | 4/1987 | Lavelle |
| 4,963,036 A | 10/1990 | Drisko et al. |
| 5,166,688 A | 11/1992 | Moreira |
| 5,196,854 A | 3/1993 | Mathews |
| 5,265,024 A | 11/1993 | Crabill et al. |
| 5,530,909 A | 6/1996 | Simon et al. |
| 5,988,862 A | 11/1999 | Kacyra et al. |
| 6,044,336 A | 3/2000 | Marmarelis et al. |
| 6,148,261 A | 11/2000 | Obradovich et al. |
| 6,232,913 B1 | 5/2001 | Lehtinen |
| 6,246,468 B1 | 6/2001 | Dimsdale |
| 6,330,523 B1 | 12/2001 | Kacyra et al. |
| 6,420,698 B1 | 7/2002 | Dimsdale |
| 6,441,773 B1 | 8/2002 | Kelly et al. |
| 6,448,922 B1 | 9/2002 | Kelly |
| 6,456,226 B1 | 9/2002 | Zheng et al. |
| 6,473,079 B1 | 10/2002 | Kacyra et al. |
| 6,501,392 B2 | 12/2002 | Gremmert et al. |
| 6,512,518 B2 | 1/2003 | Dimsdale |
| 6,512,993 B2 | 1/2003 | Kacyra et al. |
| 6,583,751 B1 | 6/2003 | Ferretti et al. |
| 6,667,710 B2 | 12/2003 | Cornell et al. |
| 6,707,415 B1 | 3/2004 | Christianson |
| 6,744,382 B1 | 6/2004 | Lapis et al. |

(Continued)

OTHER PUBLICATIONS

NexRAD Radar: "View the Big Picture up to 500 Miles Ahead and Fly the Smartest Route Between Two Points"; Echo Flights https://www.echoflight.com/nexrad.html; 1 page printed Apr. 28, 2009.

(Continued)

*Primary Examiner* — Timothy A Brainard
(74) *Attorney, Agent, or Firm* — Lowe Graham Jones PLLC (57) ABSTRACT

Systems and methods communicate weather information between aircraft using low bandwidth communication transceivers. An exemplary embodiment receives weather information from a weather radar system on board a remote aircraft, processes the received weather information into weather radar image information that is displayable on at least a display, processes the weather radar image information into a reduced size dataset, and communicates the reduced size dataset to an installation aircraft over the low bandwidth communication channel, wherein the low bandwidth communication channel is generated by a low bandwidth communication transceiver on board the remote aircraft.

19 Claims, 5 Drawing Sheets

U.S. PATENT DOCUMENTS

| | | | |
|---|---|---|---|
| 6,828,922 B1 | 12/2004 | Gremmert et al. | |
| 6,917,860 B1 | 7/2005 | Robinson et al. | |
| 6,977,608 B1 | 12/2005 | Anderson et al. | |
| 7,027,898 B1 | 4/2006 | Leger et al. | |
| 7,039,505 B1* | 5/2006 | Southard et al. | 701/3 |
| 7,081,834 B2 | 7/2006 | Ruokangas et al. | |
| 7,085,562 B1 | 8/2006 | Holder et al. | |
| 7,365,673 B2 | 4/2008 | Makkapati et al. | |
| 7,379,816 B2 | 5/2008 | Southard et al. | |
| 7,463,955 B1 | 12/2008 | Robinson et al. | |
| 7,467,031 B2 | 12/2008 | King | |
| 7,471,995 B1 | 12/2008 | Robinson | |
| 7,474,250 B2 | 1/2009 | Makkapati et al. | |
| 7,515,088 B1 | 4/2009 | Woodell et al. | |
| 7,633,428 B1* | 12/2009 | McCusker et al. | 342/26 B |
| 2002/0039072 A1* | 4/2002 | Gremmert et al. | 340/945 |
| 2002/0107988 A1* | 8/2002 | Jordan | 709/247 |
| 2002/0151992 A1* | 10/2002 | Hoffberg et al. | 700/83 |
| 2003/0006928 A1* | 1/2003 | Szeto et al. | 342/26 |
| 2003/0156046 A1* | 8/2003 | Dwyer et al. | 340/973 |
| 2004/0068583 A1* | 4/2004 | Monroe et al. | 709/246 |
| 2004/0183695 A1 | 9/2004 | Ruokangas et al. | |
| 2006/0145912 A1 | 7/2006 | Makkapati et al. | |
| 2007/0088467 A1* | 4/2007 | H. Knotts | 701/14 |
| 2008/0040038 A1 | 2/2008 | Southard et al. | |
| 2008/0158049 A1 | 7/2008 | Southard et al. | |
| 2009/0082954 A1* | 3/2009 | Ridenour, II | 701/206 |
| 2009/0323720 A1* | 12/2009 | Salokannel et al. | 370/468 |

OTHER PUBLICATIONS

Richard C. Wilson et al.; "A Radar Reflectance Model for Terrain Analysis Using Shape From Shading"; proceedings of the International Conference for Image Analysis Processing; pp. 868-873; Sep. 27-29, 1999.

Control Vision Corp.; Anywhere Wx—Aviation Weather; http://web.archive.org/web/20070202054903/http://www.anywheremap.com/aviation-weather.aspx; 2005.

Richard Mamrosh, "Aircraft Weather Observations Improve Forecasts," The Front, vol. 2, No. 2, pp. 7; Jul. 2003.

Rediess et al., "Autonomous Civil Aircraft—The Future of Aviation," Aerospace America, pp. 40-43, Jul. 2006.

H. Paul Stough III, "Aircraft Weather Mitigation for the Next Generation Air Transportation System," NASA Langley Research Center, 15.8, pp. 1-6, Dec. 2004.

Thomas A. Horne, "Future Flight: Links to Tomorrow," AOPA Online, http://www.aopa.org/pilot/features/future0002.html, vol. 43, No. 2, Feb. 2000.

Patrick D. McCuster and Eric N. Anderson, Weather Data Aggregation and Display System for Airborne Network of Member Aircraft, U.S. Appl. No. 11/014,118, Dec. 15, 2004.

* cited by examiner

SYSTEMS AND METHODS FOR AIRCRAFT TO AIRCRAFT EXCHANGE OF RADAR INFORMATION OVER LOW BANDWIDTH COMMUNICATION CHANNELS

BACKGROUND OF THE INVENTION

Aircraft weather radars display hazardous weather information based upon analyzed radar returns. Radar return information corresponding to detected hazardous weather information is presented to the aircraft crew on a display, typically using a plan view showing a geographic area over which the aircraft is traversing. Some radar systems may be optionally configured to present a selected portion of the hazardous weather information corresponding to a vertical slice view along a selected azimuth relative to the aircraft, such as along the aircraft's heading. Such a vertical slice displays the altitude and relative distance from the aircraft of any hazardous weather that lies along the selected vertical slice.

However, weather radars have a limited effective range. Radar range can be limited by terrain and the altitude of the aircraft. For example, an aircraft at cruising altitude over Kansas may have an effective radar range of about 300 nautical miles based upon the curvature of the earth and the output signal strength of the emitted radar signal. This effective range of the onboard radar may be referred to as the radar horizon. In Colorado, the effective range of the weather radar will be significantly reduced when mountain ranges block the emitted radar signals. When the aircraft is taking off or landing, the low altitude of the aircraft will result in a limited radar range since the earth horizon is relatively close to the aircraft (as compared to the earth horizon when the aircraft is at cruising altitude).

Accordingly, the weather radar will not show weather and/or objects of interest to the crew that is beyond the range of the weather radar. For example, the aircraft may be travelling at a relatively fast speed while at cruising altitude. Even though the effective range of the weather radar is several hundred miles out from the aircraft, the aircraft will traverse that distance in a relatively short period of time. Accordingly, it is desirable to effectively extend the range of an aircraft's weather radar so that the crew of the aircraft has more time to respond to adverse weather conditions and/or potentially dangerous objects, such as other aircraft.

SUMMARY OF THE INVENTION

An aircraft to aircraft weather radar information communication system and method are disclosed. An exemplary embodiment has an onboard weather radar system on a first aircraft that generates weather information based on detected weather, an onboard processing system coupled to the onboard weather radar system, wherein the onboard processing system processes the weather information into a reduced size dataset, and an onboard low bandwidth communication transceiver coupled to the onboard processing system, wherein the onboard low bandwidth communication transceiver transmits the reduced size dataset to a remote low bandwidth communication transceiver onboard a second aircraft.

In accordance with further aspects, an exemplary embodiment receives weather information from a weather radar system on board a remote aircraft, processes the received weather information into weather radar image information that is displayable on at least a display, processes the weather radar image information into a reduced size dataset, and communicates the reduced size dataset to an installation aircraft over the low bandwidth communication channel, wherein the low bandwidth communication channel is generated by a low bandwidth communication transceiver on board the remote aircraft.

BRIEF DESCRIPTION OF THE DRAWINGS

Preferred and alternative embodiments are described in detail below with reference to the following drawings.

DETAILED DESCRIPTION OF THE PREFERRED EMBODIMENT

Embodiments of the weather radar information communication system 100 process radar information detected by an onboard radar and communicates the radar information to other aircraft using a low bandwidth communication channel. For example, HF (high frequency), VHF (very high frequency), and UHF (ultra high frequency) radio systems use relatively low bandwidth channels to provide aircraft-to-aircraft, aircraft-to-ground, and/or ground-to-aircraft communications. Embodiments of the weather radar information communication system 100 communicate processed radar information using such low bandwidth channels.

Figure 1:
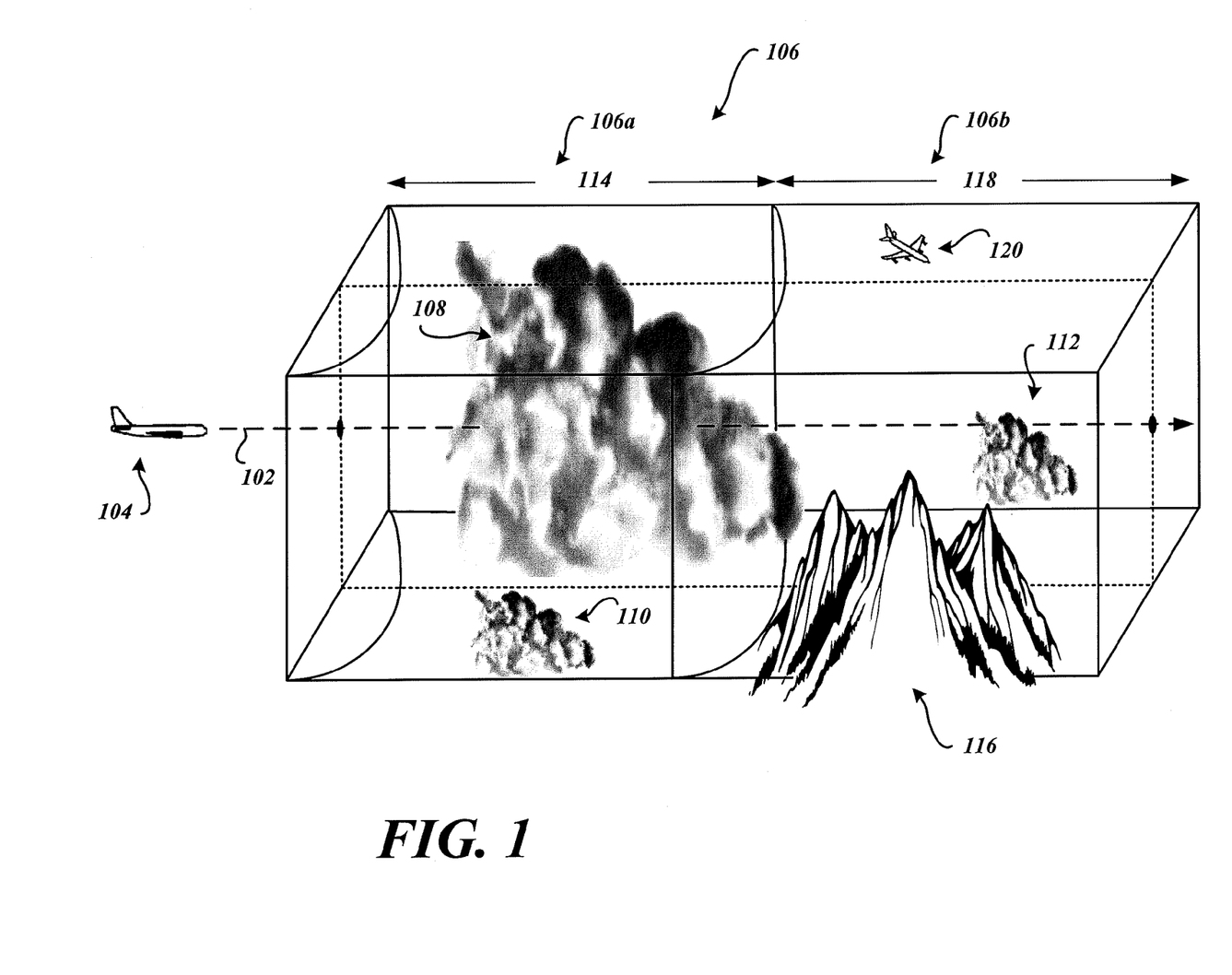
FIG. 1 is a perspective view of a portion of a planned flight path of an installation aircraft through a region of space having a plurality of storm cells, some of which are beyond the effective range of the installation aircraft's onboard weather radar.

FIG. 1 is a perspective view of a portion of a planned flight path 102 of an installation aircraft 104 through a region of space 106 having a plurality of storm cells 108, 110, 112, some of which are beyond the effective range of the installation aircraft's onboard weather radar. The term "weather" generally refers to any type of weather radar detectable weather phenomena, such as, but not limited to, storm cells, turbulence regions, clouds, precipitation, hail, snow, wind shear, icing conditions, and the like that the installation aircraft 104 may encounter.

In this example, the storm cells 108, 110 are within the effective range 114 of the installation aircraft's onboard weather radar. However, the remote storm cell 112 lies beyond the effective range 114 of the installation aircraft's onboard weather radar. Accordingly, the installation aircraft 104 cannot detect the storm cell 112.

The storm cell 112 may lie beyond the effective range 114 of the installation aircraft's onboard weather radar for a variety of reasons. For example, the installation aircraft 104 may be taking off and thus, may be at a relatively low altitude. Or, there may be an intervening mountain range 116 that is blocking detection of the storm cell 112. Or, the storm cell 112 may be so far out in front of the installation aircraft 104 that it is simply not detectable.

Here, the illustrated region of space 106b lies beyond the effective range 114 of the weather radar of the installation aircraft 104, as denoted as the range 118. However, a remote aircraft 120 is relatively near the storm cell 112. Accordingly, the storm cell 112 is detectable by the weather radar of the remote aircraft 120. Embodiments of the weather radar information communication system 100 process radar information detected by the onboard radar of the remote aircraft 120 and communicate the radar information to the installation aircraft 104 using a low bandwidth communication channel. Accordingly, the installation aircraft 104 is able to generate a radar display that indicates the storm cell 112 to its crew.

Figure 2:
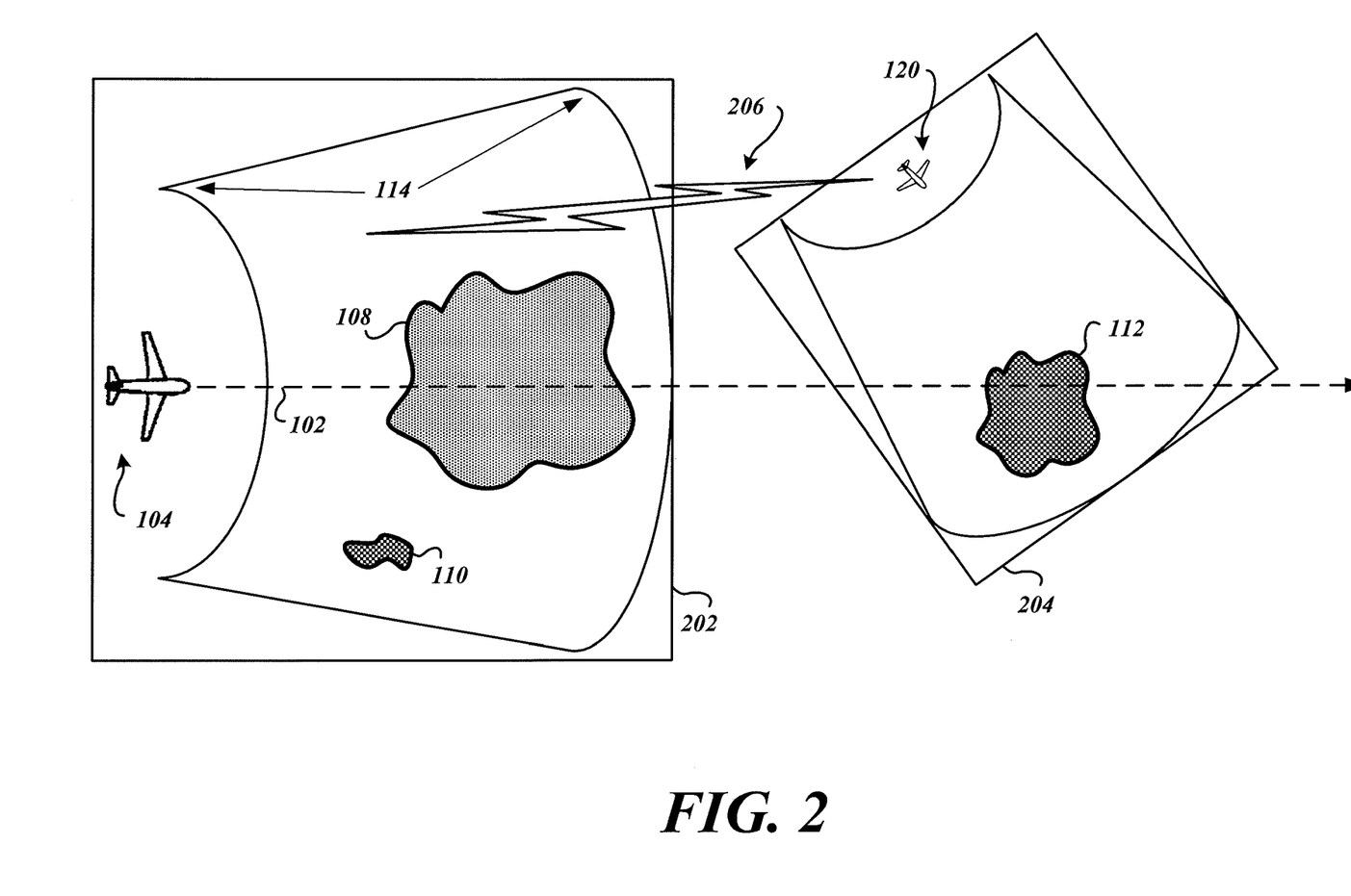
FIG. 2 is a conceptual weather radar display of the effective range of the aircraft's onboard weather radar and a weather radar display of the effective range of a remote aircraft's weather radar.

FIG. 2 is a conceptual weather radar display 202 of the effective range of the aircraft's onboard weather radar and a weather radar display 204 of the effective range of a remote aircraft's weather radar. The weather radar displays 202, 204 are plan views of detected weather within the range of the weather radars of the aircraft 104, 120, respectively. Similar to FIG. 1, reference numerals of the icons of FIG. 2 correspond to the reference numerals of the storm cells 108, 110, 112 of FIG. 1.

The presented weather radar displays 202, 204 may be based upon two-dimensional (2-D) databases which are filled with radar return information (using bins, for example, based on range and bearing values with respect to the current location of the aircraft 104, 120). In other embodiments, the presented weather radar displays 202, 204 may be based upon three-dimensional (3-D) databases which are filled with radar return information (using 3-D bins or voxels, for example, based on range, azimuth, and elevation values with respect to the current location of the aircraft 104, 120). An exemplary embodiment of a 3-D weather radar system is implemented in accordance with the commonly assigned U.S. Pat. No. 6,667, 710, filed on Feb. 19, 2002, to Cornell et al., which is incorporated herein by reference in its entirety.

Some embodiments may generate bit map data sets that correlate to the radar return information. Thus, a particular data bin or voxel will simply store the bit map data corresponding to a displayed color, fill pattern or shading.

The images displayed on the weather radar displays 202, 204 comprise picture information generally described as colored regions that define size and relative position of detected weather. Color indicates various attributes of the weather, such as intensity and/or weather type. In some embodiments, the weather radar displays 202, 204 may be configured to display vertical slices of weather information along a specified radial so as to impart information pertaining to the altitude of the weather.

The weather radar information from the remote aircraft 120 is communicated to the installation aircraft 104 over a low bandwidth communication channel signal 206. Further, in some situations, the local weather radar information from the installation aircraft 104 is communicated to the remote aircraft 120 over the low bandwidth communication channel signal 206. In some embodiments, information corresponding to the images on the weather radar displays 202, 204 are communicated (such as, but not limited to, pixel information). In other embodiments, information used to generate the images on the weather radar displays 202, 204 are communicated.

Further, the current location of the transmitting aircraft is included with the communicated remote weather radar information. Some embodiments include the time that the remote radar information was collected and/or the heading of the transmitting aircraft. Further, bearing information which identifies relative orientation of the detected remote weather to the transmitting aircraft is included.

Embodiments of the weather radar information communication system 100 correlate the known location of the receiving aircraft (here, the installation aircraft 104) with the location of the transmitting aircraft (here, the remote aircraft 120). Accordingly, the relative location of the received remote weather radar information is determined, and then is added to the local weather radar information of the receiving aircraft (here, the installation aircraft 104) to effectively extend the range of the receiving aircraft's weather radar.

Alternatively, or additionally, the remote weather information may be processed such that the location (latitude, longitude and/or elevation) of the detected remote weather is determined and then included in the communicated weather information. Accordingly, embodiments of the weather radar information communication system 100 can select weather information in areas of interest (such as the region of space 106b that is beyond the effective range 114 of the onboard weather radar system 310).

Figure 3:
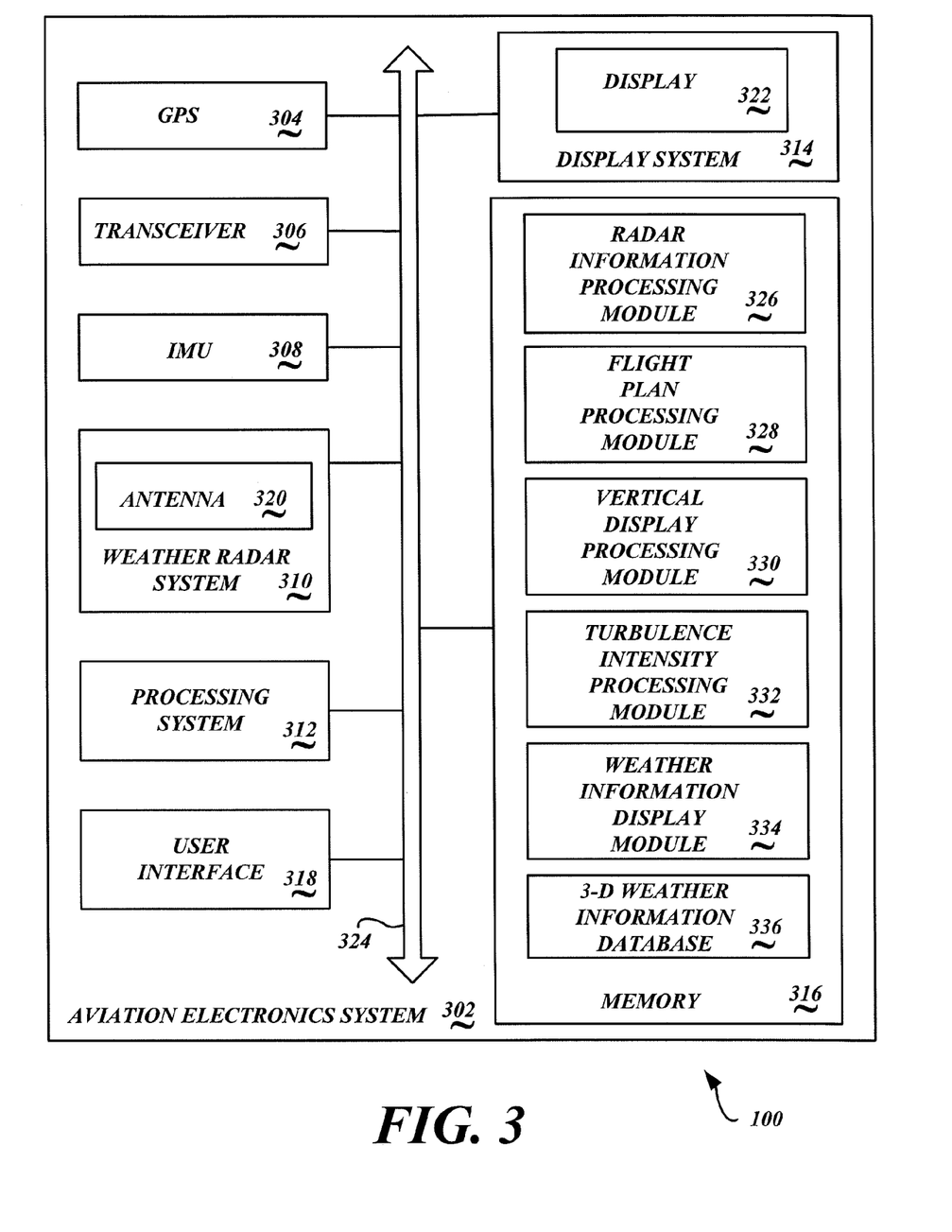
FIG. 3 is a block diagram of an exemplary embodiment of the weather radar information communication system implemented in an aviation electronics system of the installation aircraft.

FIG. 3 is a block diagram of an exemplary embodiment of the weather radar information communication system 100 implemented in an aviation electronics system 302 of the installation aircraft 104. The remote aircraft 120 is similarly equipped. The aviation electronics system 302 includes a global positioning system (GPS) 304, a transceiver 306, an inertial measurement unit (IMU) 308, a weather radar system 310, a processing system 312, a display system 314, a memory 316, and a crew interface 318. The weather radar system 310 includes an antenna 320 that is operable to emit radar signals and receive radar returns. The display system 314 includes a suitable display 322. In some embodiments, the display 322 may be in an electronics flight bag or an ARINC 453 display. It is appreciated that the aviation electronics system 302 may not include all of the above components, and/or may include other components and/or systems that are not illustrated or described herein.

The above-described components, in an exemplary embodiment, are communicatively coupled together via communication bus 324. In alternative embodiments of the aviation electronics system 302, the above-described components may be communicatively coupled to each other in a different manner. For example, one or more of the above-described components may be directly coupled to the processing system 312, or may be coupled to the processing system 312 via intermediary components (not shown).

The weather radar system 310 may be any suitable radar system, such as, but not limited to, a weather radar that is operable to detect weather that is located relatively far away from the aircraft 104. The antenna 320 emits radar pulses and receives radar returns. A radar return is reflected energy from an object upon which the emitted radar pulse is incident on. The antenna 320 is swept in a back-and-forth motion, in an up and down direction, and/or in other directions of interest, such that the radar system 310 is able to detect weather, and more particularly turbulence, in an area of interest about the aircraft 104. Embodiments of the weather radar information communication system 100 may be implemented in other types and/or or applications of radar, such as marine radar.

The GPS 304 determines the current location of the installation aircraft 104. The IMU 308 may also be used to determine the current location, or supplement determination of the current location, of the installation aircraft 104.

The user interface 318 receives input from the crew of the installation aircraft 104. Accordingly, the crew may optionally elect to view only radar information detected by the weather radar system 310, may elect to view radar information received by other remote aircraft, or view both.

Transceiver 306 is a low bandwidth, long range, communication device. In some embodiments, the transceiver 306 is used for voice communications. For example, the crew of the installation aircraft 104 may talk with the crew of the remote aircraft 120. In some situations, after a discussion between the crews, the radar information may be transmitted. Thus, the crew of the transmitting aircraft (here, the installation aircraft 104) may input a suitable command via the user interface 318 to cause transmission of the weather radar information to the receiving aircraft (here, the remote aircraft 120). In some situations, the weather radar information may be exchanged between the aircraft. In some embodiments, weather radar information is automatically exchanged between the aircraft. Further, weather information may be received from, or sent to, a ground station.

Such long range, low bandwidth transceivers 306 may communicate using UHF, VHF and/or UF frequencies. Thus, the low bandwidth transceivers may be part of a HF (high frequency) radio system, a VHF (very high frequency) radio system, and/or a UHF (ultra high frequency) radio system.

For example, an exemplary VHF data link system has bandwidth of 31.5 kilo-bits per second (Kbps) and at a range of greater than 400 nautical miles air-to-air. Another exemplary transceiver 306 is a 1090 MHz Mode S Extended Squitter (1090 ES) data-link which is capable of up to one (1) mega-bits per second (Mbps) for aircraft based transmitters, and at a range of up to 200 nautical miles. Accordingly, a low bandwidth communication system has a channel capacity of approximately 1 Mbps or less. In some embodiments, the low bandwidth systems support voice communications between the crew of the installation aircraft 104 and crew of other aircraft and/or persons on the ground, such as air traffic controllers.

Accordingly, the bandwidth capacity of the transceivers 306 is measured on the order of tens of kilo bits per second depending upon the frequency used by the transceivers 306. Thus, insufficient bandwidth capacity is available over the transceivers 306 to transfer raw weather radar information. Further, there is often insufficient bandwidth capacity available over the transceivers 306 to transfer weather radar image information. Accordingly, embodiments of the weather radar information communication system 100 process, or parameterize, the weather radar information and/or the weather radar image information into a reduced data set of remote weather radar information that may be transferred using the relatively low bandwidth capacity available from the transceivers 306. Further, communication of the reduced data sets allows use of the transceivers 306 for other purposes, such as voice communications. Reduced data sets may also include refreshes which are used to update previously sent reduced data sets.

An exemplary embodiment of the weather radar information communication system 100 comprises a plurality of cooperatively acting modules. The modules are identified as a radar information processing module 326, a flight plan processing module 328, an optional vertical display processing module 330, an optional turbulence intensity processing module 332, and a weather information display module 334. Modules 326, 328, 330, 332, 334 reside in the memory 316, and are retrieved and executed by the processing system 312. In other embodiments, the modules 326, 328, 330, 332, 334 may be implemented together as a common module, may be integrated into other modules, or reside in other memories (not shown).

In an exemplary embodiment, a weather information database 336 is stored in memory 316, which may, in some embodiments, include three-dimensional (3-D) weather information. Further, the weather information database 336 may be implemented with other databases, may be implemented in various formats, such as a buffer or the like, and/or may be implemented in another memory.

The radar information processing module 326 processes radar returns detected by the antenna 320 of the radar system 310. Various types of weather, and their associated attributes, are determined by the radar information processing module 326. The determined local weather information is saved into the corresponding bins (2-D) or voxels 304 (3-D) in the weather information database 336.

The weather information display module 334 accesses the weather information stored in the weather information database 336 and constructs a displayable image corresponding to a graphical presentation of the local weather information. Additionally, remote weather information in the reduced size dataset is used to generate a displayable image of the remote weather. The image of the remote weather is combined with the image of the local weather. The displayable image of the local weather information is communicated to the display system 314 and is presented on the display 322 as the weather radar display 202 (FIG. 2). The displayable image, in some embodiments, is in the form of bit map data.

The optional flight plan processing module 328 processes flight plan information. Flight plans may be predefined and/or entered by the crew. A predefined flight plan typically comprises a plurality of planned flight path segments based upon a series of waypoints. Planned flight path segments may be straight or curvilinear. The flight plan information includes geographic location information that defines location of waypoints and/or the flight path segments, and planned altitude information. The flight plan information may optionally include various limits, such as altitude floors, altitude ceilings, and/or exclusion regions or zones. In some embodiments, the flight plan may be dynamically adjusted during flight based upon crew input, based upon current location of the aircraft 104 as provided by the GPS 304 and/or the IMU 308, and/or based upon instructions or information received by the transceiver 306. Accordingly, the flight plan may be used to determine regions of space beyond the detection range of the weather radar system 310 of the installation aircraft 104 that is of interest to the crew. The determined regions of space is then used to filter, or otherwise select, radar information received from remote aircraft.

The optional turbulence intensity processing module 332 further processes weather radar return information to determine turbulence intensity information for detected turbulence and location of the turbulence region. The turbulence intensity information and location information is saved into the weather information database 336. The turbulence information may be transmitted as weather information.

The optional vertical display processing module 330 retrieves weather information along a predefined or selected vertical plane or slice. The retrieved weather information is communicated to the weather information display module 334, which prepares an image corresponding to the vertical slice which is then displayed on the display 322.

Figure 4:
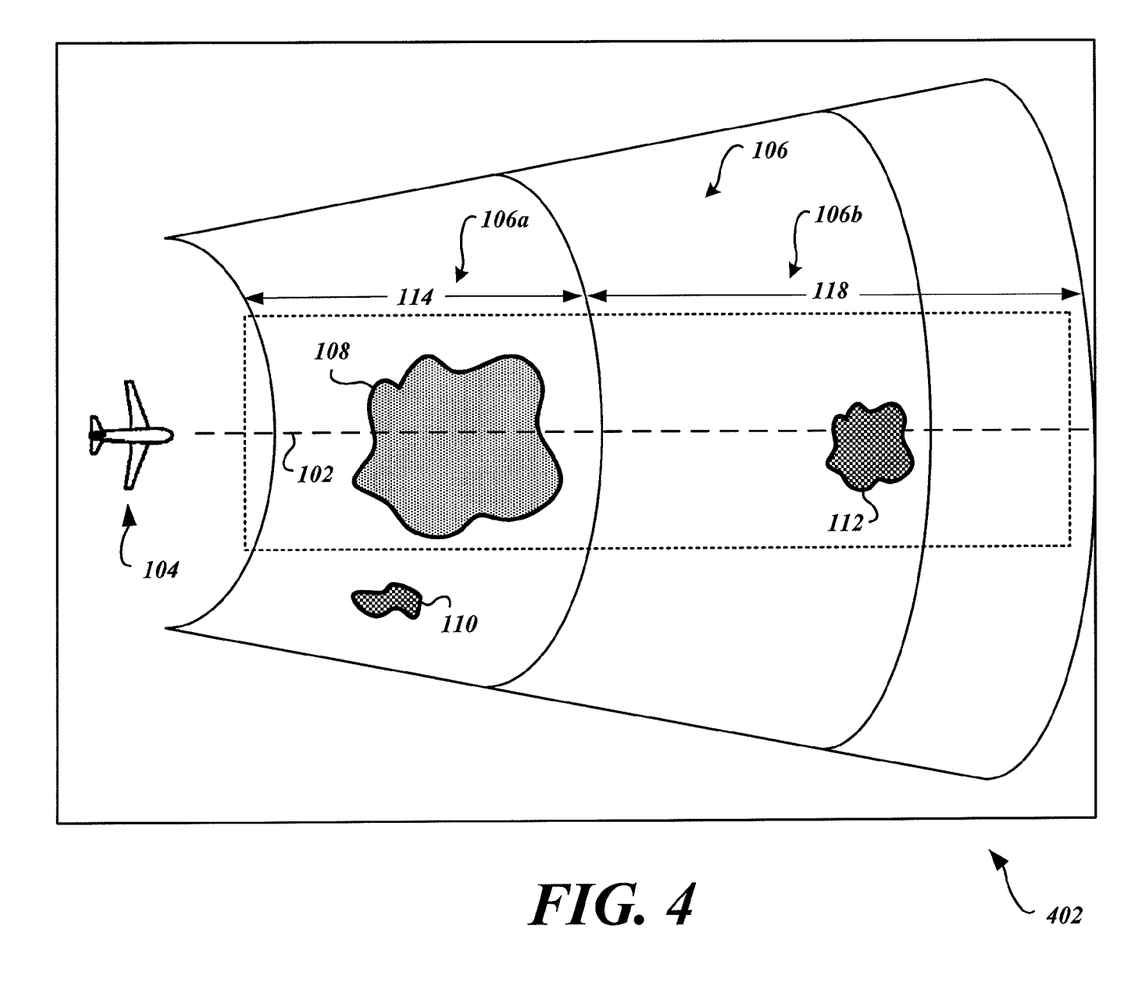
FIG. 4 is a display image presenting a weather radar display of the planned flight path through the plurality of storm cells based upon the installation aircraft's onboard weather radar system and information received from the remote aircraft's weather radar system.

FIG. 4 is a display image presenting a weather radar display 402 of the planned flight path 102 through the plurality of storm cells 108, 110, 112 based upon the installation aircraft's onboard weather radar system 310 and information received from the remote aircraft's weather radar system 310.

Similar to FIG. 1, reference numerals of the icons of FIG. 4 correspond to the reference numerals of the storm cells 108, 110, 112 of FIG. 1.

The weather radar display 402 in the installation aircraft 104 includes a display of the storm cells 108, 110 detected by its onboard weather radar system 310 (FIG. 3). The onboard weather radar system 310 detects local weather out to its maximum range 114. Local weather radar information is generated based on the detected local weather.

Beyond the maximum range 114, the weather radar display 402 displays the storm cell 112 detected by the weather radar system 310 of the remote aircraft 120. Thus, remote weather information out beyond the range 114, denoted as the range 118, can be shown to the crew of the installation aircraft 104.

Figure 5:
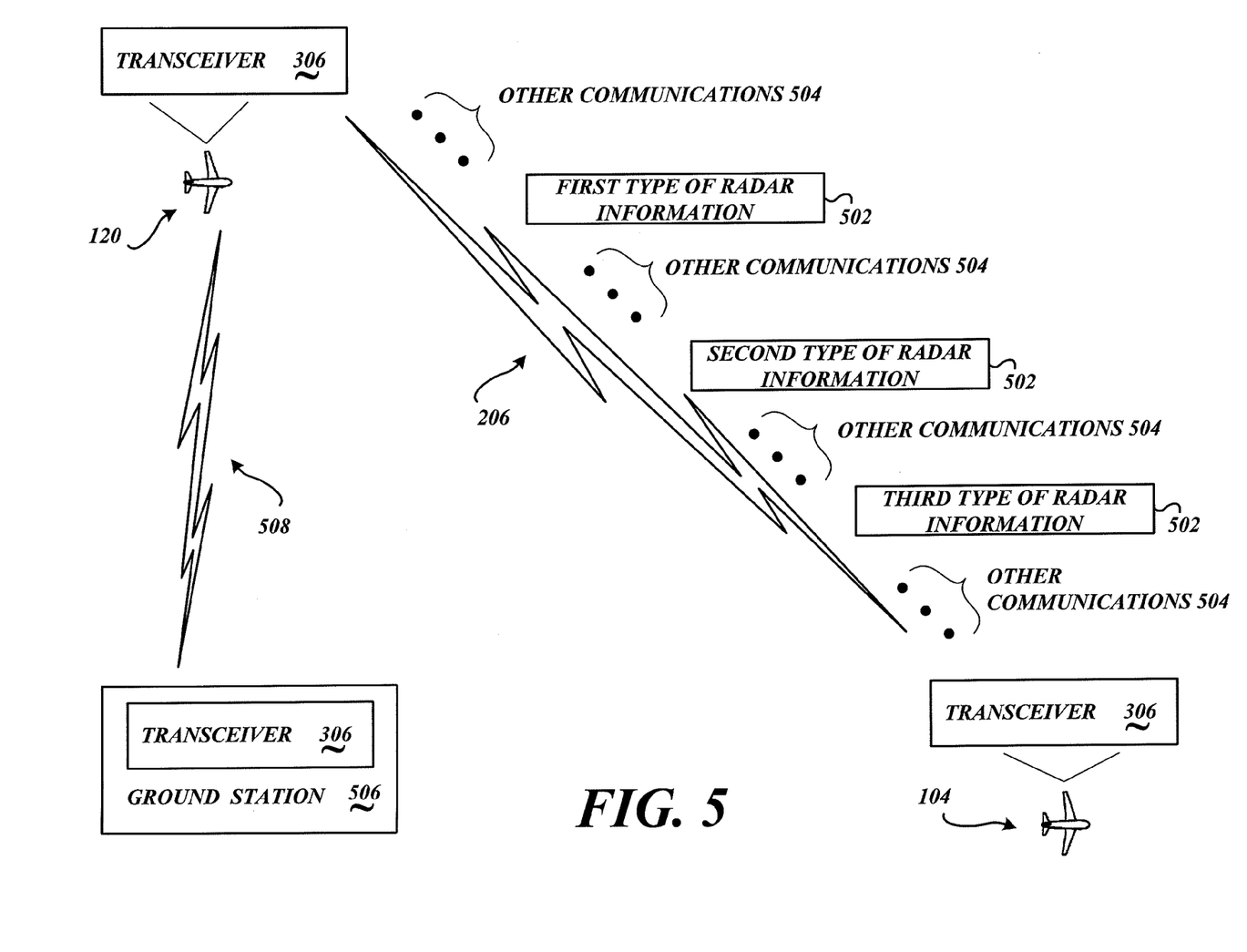
FIG. 5 conceptually illustrates a low bandwidth communication signal with communicated weather information.

FIG. 5 conceptually illustrates the low bandwidth communication signal 206 with communicated weather information. At various times, the low bandwidth communication signal 206 will contain a reduced size dataset 502 (corresponding to weather detected by the remote aircraft 120). At other times, other communications 504 may be contained in the low bandwidth communication signal 206. For example, the communications 504 may include voice information corresponding to a conversation between the crew of the aircraft 104, 120. It is appreciated that the low bandwidth communication signal 206 supports two-way communications (such as voice conversations). Accordingly, the installation aircraft 104 can optionally return weather radar information (in the form of reduced size datasets) detected by its weather radar system 310 to the remote aircraft 104.

Further, a ground station 506 may be equipped with a transceiver 306, or another compatible transceiver, such that a low bandwidth communication signal 508 may be received from the remote aircraft 120 with reduced size datasets corresponding to the weather radar information. (Or, it is appreciated that the signals 206, 508 may be the same signal received at both the installation aircraft 104 and the ground station 506.)

Embodiments of the weather radar information communication system 100 may use one or more techniques to process the weather radar information into a reduced size dataset 502 that is communicated over a low bandwidth communication channel.

An exemplary low bandwidth communication signal is generated by converting radar intensity information into a relatively small, reduced size dataset 502. For example, the radar intensity information may be used to generate bit map information for a plurality of bins or voxels of a 2-D or 3-D reduced size dataset 502. The bit map information may be a small binary number corresponding to a predefined color that identifies a particular value, or range of values, of the radar return intensities. Thus, the radar return intensity information is converted to a relatively small bit number for each particular bin or voxel, and is then assembled into the reduced size dataset 502.

The communicated reduced size dataset 502 includes sufficient location information so that the location of the weather detected by the remote aircraft 120 is determinable. For example, but not limited to, the bin location information, the current location of the remote aircraft 120 (geographic location, and optionally, heading, speed, and/or altitude information), and bearing information (corresponding to the direction of the antenna 320 of the remote aircraft 120 at the time that the radar returns were collected) is included with or in the reduced size dataset 502.

The installation aircraft 104, upon receiving one of the reduced size datasets 502, correlates its current location with the location information of the remote aircraft 120. Knowing the location of the remote aircraft, and the relative location of the information contained in the reduced size dataset 502, the location of the weather detected by the remote aircraft 120 is determined.

Additionally, or alternatively, one or more other processing techniques may be used. For example, run-length encoding may be used to further reduce the amount of information that is communicated in the reduced size dataset 502. For example, if large regions of space scanned by the weather radar system 310 of the remote aircraft contains no weather, which is shown as a black area on the weather radar displays 202, 204, run-length encoding may be used to identify a region of space with no detected weather. Similarly, a region of space scanned by the weather radar system 310 of the remote aircraft may indicate the presence of particularly severe weather, which may be shown as a red or magenta area on the weather radar displays 202, 204. Run-length encoding may be used to identify the region of space with the severe weather.

Additionally, or alternatively, regions of space (3-D weather) or areas (2-D weather) may be defined using volume or area geometries. For 2-D weather information, an area having a particular type of weather (as defined by radar intensities) may be bounded by corner points of the area. As another example, a border of the area may be specified as a vector. Other embodiments may use vector graphics to define weather. For example, but not limited to, a large rectangular area may be defined by the location of four points, or may be defined by the location of two points and two vectors (defining two borders of the rectangle). For 3-D weather information, a volume having a particular type of weather may be defined by the location of corner points and/or vectors. Any suitable geometry that defines a 2-D area or a 3-D volume for the weather may be used.

Additionally, or alternatively, selecting weather information with radar values greater than a specified threshold, or values less than a specified threshold, or falling within one or more threshold ranges, may be used to further reduce the amount of information that is communicated in the reduced size dataset 502. If large regions of space scanned by the weather radar system 310 of the remote aircraft contains no weather, then this information is not included in the communicated reduced size dataset 502. For example, but not limited to, if very light precipitation is detected, which is not likely to be of significant interest, then this information (which has a radar return intensity less than a threshold) is not included in the communicated reduced size dataset 502.

Further, a weather radar system typically categorizes radar return information based upon radar return intensities. For example, moderately severe weather may be displayed in a first color (such as yellow) and severe weather may be displayed in a second color (such as red). Some embodiments of the weather radar information communication system 100 use different categories of radar return intensities when constructing a reduced size dataset 502. For example, the moderately severe weather and the severe weather may be categorized as a single type of weather in the reduced size dataset 502.

Additionally, or alternatively, JPEG (Joint Photographic Experts Group), GIF (Graphics Interchange Format), and/or MPEG (Moving Picture Experts Group) data compression techniques may be used to compress the reduced size datasets 502. Embodiments may use any suitable image compression technique now known or later developed.

Additionally, or alternatively, changes in weather data may be communicated. For example, the reduced size dataset 502a may initially include a detailed reduced size dataset 502 sufficient to construct an image of all of the weather detected by the remote aircraft 120. Assuming that the installation aircraft 104 and the remote aircraft 120 are continuously, or periodically, in communication with each other, a later communicated second reduced size dataset 502*b* may include changes in the detected weather. Thus, the amount of information in the reduced size dataset 502*b* can be significantly reduced over the amount of information in the reduced size dataset 502*a*. In an exemplary embodiment, JPEG (Joint Photographic Experts Group), GIF (Graphics Interchange Format), and/or MPEG (Moving Picture Experts Group) data compression techniques are used to compress successive, time-related reduced size datasets 502. Thus, the original reduced size dataset 502*a* is "refreshed" by successively received reduced size datasets 502*b*, 502*c*.

Further, the "refresh rate" of communicated reduced size datasets 502*b*, 502*c* may be varied. For example, if the weather is not changing, or changing slowly, the time between the communication of the reduced size datasets 502*b*, 502*c* may be increased. If the weather is rapidly changing, the time between communication of the reduced size datasets 502*b*, 502*c* may be decreased.

Additionally, or alternatively, fractal compression techniques may be used to further reduce the amount of information in a reduced size dataset 502. Thus, the radar image data is convert into fractals, or more precisely, converted into geometric shapes into mathematical data called "fractal codes" which are used to recreate the encoded image.

Additionally, or alternatively, the information in a reduced size dataset 502 may pertain to a particular type of weather. Weather radar systems 310 may be operable to identify convective weather, turbulence, hail, lightning, and/or icing conditions. For example, the reduced size dataset 502*a* may contain convective weather information. The second reduced size dataset 502*b* may contain turbulence information, and so on. Since any particular reduced size dataset 502 contains information for a single type of weather, the amount of information that is communicated in the reduced size dataset 502 is decreased. Further, only information of interest may be communicated. For example, the installation aircraft 104 may be interested in receiving turbulence information from the remote aircraft 120 and not other types of weather information. Thus, the amount of information that is communicated in the reduced size dataset 502 is decreased by eliminating information that is not of interest.

Additionally, or alternatively, the information in a reduced size dataset 502 may pertain to a particular altitude of weather. Weather radar systems 310 may be operable to identify the altitude of weather. Accordingly, weather at a selected altitude, or within a selected altitude range, may be included in a reduced size dataset 502. Detected weather above and/or below the selected altitude or altitude range may be excluded from the reduced size dataset 502.

In some embodiments, the installation aircraft 104 sends an interrogation signal to the remote aircraft 120. In response to receiving the interrogation signal, the remote aircraft 120 transmits one or more reduced size datasets 502. In other embodiments, the remote aircraft 120 continuously, or periodically, automatically transmits one or more reduced size datasets 502.

In some embodiments, the crew of the remote aircraft selects information of interest that is communicated. For example, the crew of the remote aircraft may select severe weather and omit non-sever weather to such that a reduced size dataset 502 is generated based upon selected weather. Any suitable selection means may be used to select weather that is included in the reduced size dataset 502.

Additionally, supplemental information may be included in a reduced size dataset 502. Examples of supplemental information include, but are not limited to, winds, temperature, humidity, air pressure, icing conditions, and/or visibility that has been detected by the remote aircraft 120.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are as follows:

1. A method for communicating weather information between aircraft using a low bandwidth communication channel defined by a capacity of approximately one megabits per second and less, the method comprising:
    initially receiving first weather information from a weather radar system on board a remote aircraft;
    processing the received first weather information into first weather radar image information that is displayable on at least a display;
    processing the first weather radar image information into a first reduced size dataset;
    communicating the first reduced size dataset to an installation aircraft;
    later receiving second weather information from the weather radar system on board the remote aircraft;
    processing the received second weather information into second weather radar image information that is displayable on the display;
    processing the second weather radar image information into a second reduced size dataset, wherein the second reduced size dataset corresponds to changes between the first weather information and the second weather information; and
    communicating the second reduced size dataset to the installation aircraft.

2. The method of claim 1, wherein the low bandwidth communication channel is configured for voice communications between a crew of the installation aircraft and a crew of the remote aircraft.

3. The method of claim 1, wherein processing the weather radar image information into the reduced size dataset comprises:
    reducing the amount of weather radar image information using run length encoding.

4. The method of claim 1, wherein processing the weather radar image information into the reduced size dataset comprises:
    reducing the amount of weather radar image information using fractal compression.

5. The method of claim 1, wherein processing the weather radar image information into the reduced size dataset comprises:
    reducing the amount of weather radar image information using at least one of JPEG (Joint Photographic Experts Group), GIF (Graphics Interchange Format), and MPEG (Moving Picture Experts Group) data compression.

6. The method of claim 1, wherein processing the weather radar image information into the reduced size dataset comprises:
    selecting an altitude of interest;
    selecting weather information at the altitude of interest;
    processing the selected weather information at the altitude of interest into the weather radar image information; and processing the weather radar image information into the reduced size dataset.

7. The method of claim 1, wherein the radar image information is storable in a three dimensional (3-D) weather information database, and wherein processing the weather radar image information into the reduced size dataset comprises:
selecting a two dimensional (2-D) area of weather with the highest radar return intensity from weather information stored in the 3-D weather information database;
processing the selected 2-D weather information into the weather radar image information; and
processing the selected weather radar image information into the reduced size dataset.

8. The method of claim 1, wherein processing the weather radar image information into the reduced size dataset comprises:
selecting a type of weather of interest;
selecting weather information corresponding to the selected type of weather;
processing the selected weather information corresponding to the selected type of weather into the weather radar image information; and
processing the weather radar image information into the reduced size dataset.

9. The method of claim 1, wherein processing the weather radar image information into the reduced size dataset comprises:
selecting a first type of weather of interest;
selecting first weather information corresponding to the selected first type of weather;
processing the selected first weather information into a first reduced size dataset;
selecting a second type of weather of interest;
selecting second weather information corresponding to the selected second type of weather;
processing the selected second weather information into a second reduced size dataset;
communicating the first reduced size dataset to the installation aircraft; and
later communicating the second reduced size dataset to the installation aircraft.

10. The method of claim 1, wherein processing the weather radar image information into the reduced size dataset comprises:
selecting a two dimensional (2-D) area of weather of interest from the weather radar image information;
defining the 2-D area of interest based upon a plurality of corner points of the 2-D area of interest; and
processing the corner points of the 2-D area of interest into the reduced size dataset.

11. The method of claim 1, wherein processing the weather radar image information into the reduced size dataset comprises:
selecting a two dimensional (2-D) area of weather of interest from the weather radar image information;
defining the 2-D area of interest based upon at least one corner point and at least one boundary of the 2-D area of interest; and
processing the at least one corner point and the at least one boundary of the 2-D area of interest into the reduced size dataset.

12. The method of claim 1, further comprising:
receiving an interrogation signal at the remote aircraft, the interrogation signal communicated from the installation aircraft,
wherein the reduced size dataset is communicated to the installation aircraft in response to receiving the interrogation signal.

13. The method of claim 1, wherein the low bandwidth communication channel comprises at least one selected from a group consisting of a HF (high frequency) channel, a VHF (very high frequency) channel, and a UHF (ultra high frequency) channel.

14. An aircraft to aircraft weather radar information communication system, comprising:
an onboard weather radar system on a first aircraft that generates first weather information based on detected weather, and that later generates second weather information based on the detected weather;
an onboard processing system coupled to the onboard weather radar system, wherein the onboard processing system processes the first weather information into a first reduced size dataset, determines changes between the first weather information and the second weather information, and generates a second reduced size dataset corresponding to the changes between the first weather information and the second weather information; and
an onboard low bandwidth communication transceiver coupled to the onboard processing system, wherein the onboard low bandwidth communication transceiver transmits the first reduced size dataset to a remote low bandwidth communication transceiver onboard a second aircraft, and later transmits the second reduced size data set to the remote low bandwidth communication transceiver onboard the second aircraft, and
wherein a capacity of the onboard low bandwidth communication transceiver is approximately one mega-bits per second and less.

15. The aircraft to aircraft weather radar information communication system of claim 14, wherein the onboard low bandwidth communication transceiver and the remote low bandwidth communication transceiver support voice communications between crews of the first aircraft and the second aircraft.

16. The aircraft to aircraft weather radar information communication system of claim 14, wherein the processing system processes the weather information received from the weather radar system into weather radar image information that is displayable on at least a weather radar display, and wherein the reduced size dataset is based upon the displayable weather radar image information.

17. A method for receiving at an installation aircraft weather information detected by a remote aircraft, the weather information communicated using a low bandwidth communication channel defined by a capacity of approximately one mega-bits per second and less, the method comprising:
receiving at an onboard low bandwidth communication transceiver a first reduced size dataset transmitted from a remote low bandwidth communication transceiver on the remote aircraft, wherein the first reduced size dataset includes at least first remote weather information pertaining to remote weather detected by the remote aircraft, and includes first location information for the remote aircraft;
later receiving at the onboard low bandwidth communication transceiver a second reduced size dataset transmitted from the remote low bandwidth communication transceiver on the remote aircraft, wherein the second reduced size dataset includes information pertaining to changes between the first remote weather detected by the remote aircraft and second remote weather detected by the remote aircraft, and includes second location information for the remote aircraft;

processing the first reduced size dataset with the first received remote weather information and the later received second reduced size dataset with the information pertaining to the change between the first remote weather and the second remote weather detected by the remote aircraft into weather radar image information that is displayable on at least a weather radar display;

receiving local weather information from a weather radar system onboard the installation aircraft;

processing the received local weather information into local weather radar image information that is displayable on the weather radar display; and displaying the local weather radar image information and the remote weather radar image information on the weather radar display.

18. The method of claim 17, further comprising:

processing the local weather radar image information into a local reduced size dataset; and communicating the local reduced size dataset to the remote aircraft using the low bandwidth communication channel.

19. The method of claim 17, wherein the onboard low bandwidth communication transceiver comprises at least one selected from a group consisting of a HF (high frequency) radio system transceiver, a VHF (very high frequency) radio system transceiver, and a UHF (ultra high frequency) radio system transceiver.

* * * * *